(12) United States Patent
Pilas

(10) Patent No.: US 7,431,361 B2
(45) Date of Patent: Oct. 7, 2008

(54) WASTE COLLECTION DEVICE

(76) Inventor: Julia Pilas, 4 Lidgewood Pkwy., Morristown, NJ (US) 07980

( * ) Notice: Subject to any disclaimer, the term of this patent is extended or adjusted under 35 U.S.C. 154(b) by 0 days.

(21) Appl. No.: 11/695,035

(22) Filed: Apr. 1, 2007

(65) Prior Publication Data

US 2007/0176444 A1    Aug. 2, 2007

Related U.S. Application Data

(63) Continuation-in-part of application No. 11/240,300, filed on Sep. 28, 2005, now abandoned.

(60) Provisional application No. 60/705,148, filed on Aug. 4, 2005.

(51) Int. Cl.
*A01K 29/00* (2006.01)
*E01H 1/12* (2006.01)

(52) U.S. Cl. ...................................... 294/1.5

(58) Field of Classification Search ................ 294/1.3, 294/1.4, 1.5, 19.1, 111, 115; 15/257.1, 104.8
See application file for complete search history.

(56) References Cited

U.S. PATENT DOCUMENTS

| | | | |
|---|---|---|---|
| 3,744,453 A * | 7/1973 | Deitch ........................ | 294/1.5 |
| 3,786,780 A | 1/1974 | Pezzino | |
| 3,819,220 A * | 6/1974 | Bredt ........................... | 294/1.5 |
| 3,910,619 A * | 10/1975 | Schmieler .................... | 294/1.4 |
| 4,010,970 A * | 3/1977 | Campbell ..................... | 294/1.5 |
| 4,037,867 A * | 7/1977 | Fano et al. .................... | 294/1.4 |
| 4,136,900 A * | 1/1979 | Thompson .................... | 294/1.5 |
| 4,335,678 A | 6/1982 | Garza et al. | |
| 4,363,508 A * | 12/1982 | Duke ............................ | 294/1.5 |
| 4,466,647 A * | 8/1984 | Spevak ........................ | 294/1.5 |
| 5,344,200 A * | 9/1994 | Yoshioka ..................... | 294/1.5 |

* cited by examiner

*Primary Examiner*—Dean J Kramer
(74) *Attorney, Agent, or Firm*—Dale J. Ream

(57) ABSTRACT

A waste collecting device includes an elongate housing having first and second ends. An ergonomic handle may be positioned adjacent the housing first end. A clamp assembly is coupled to the housing second end that includes a pair of hook members pivotally movable between open and closed configurations. A disposable bag may be positioned on the hook members into which a dog's waste may be collected and disposed. A manually operated trigger may be attached to the housing adjacent the handle that is operatively connected to the clamp assembly for moving the hook members between the open and closed configurations. More particularly, a linkage is situated in the housing that connects the trigger with the hook members, the linkage including a pulley, push rod, and pull string. The waste collecting device includes a light source mounted to the housing for selectively illuminating the clamp assembly and bag.

18 Claims, 4 Drawing Sheets

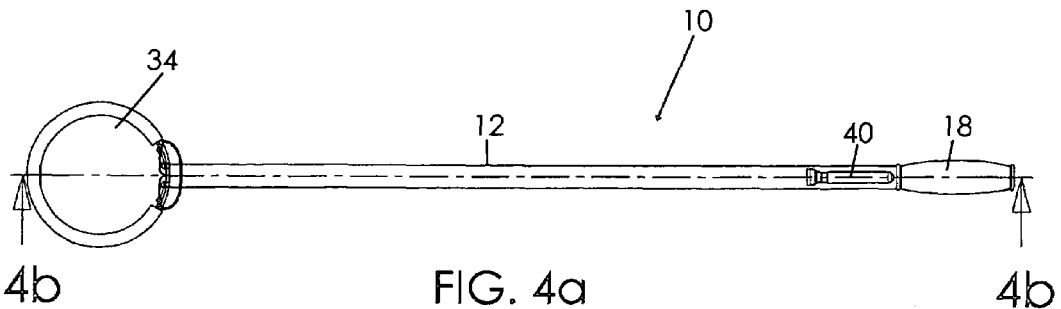
FIG. 4a
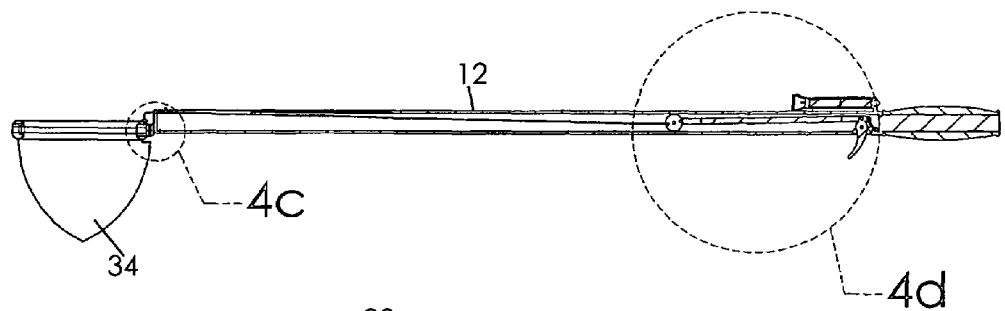
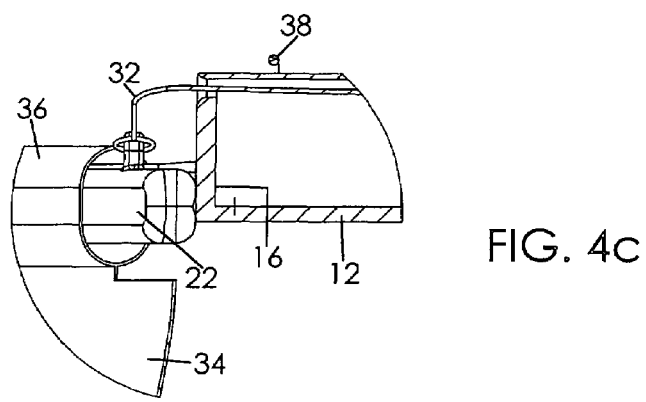
FIG. 4c
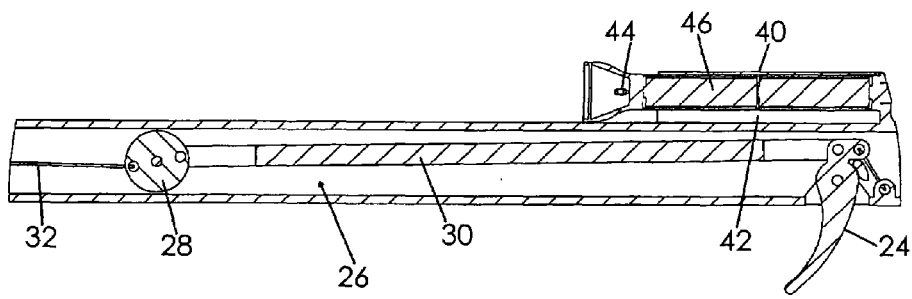
FIG. 4d

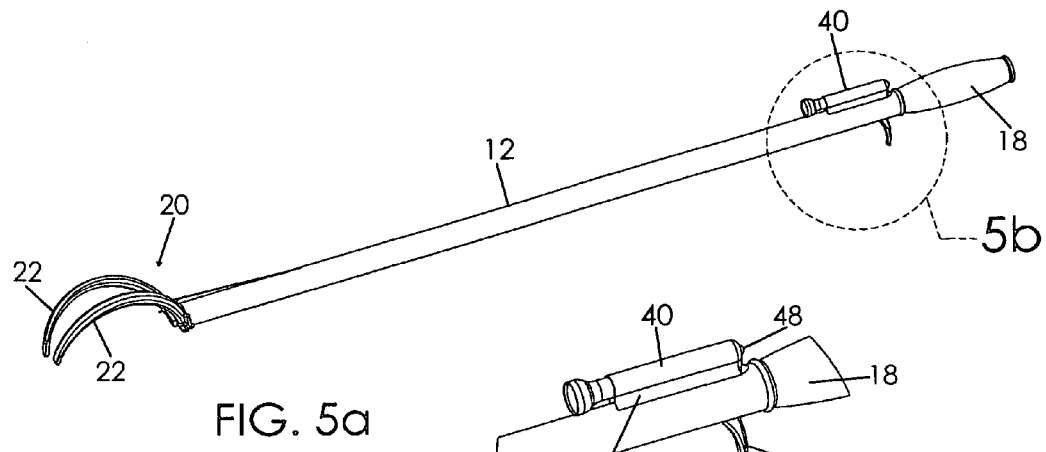
FIG. 5a
FIG. 5b
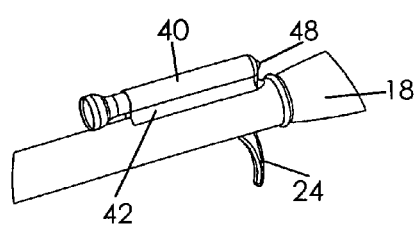
FIG. 5c
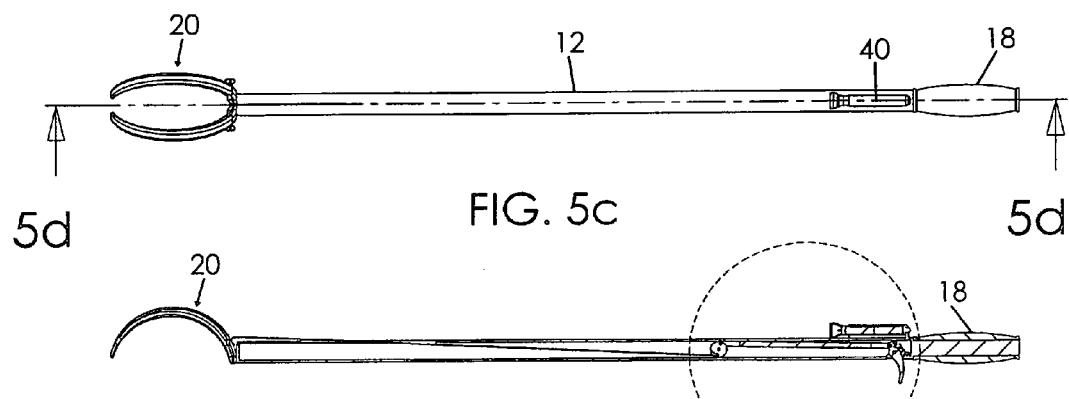
FIG. 5e
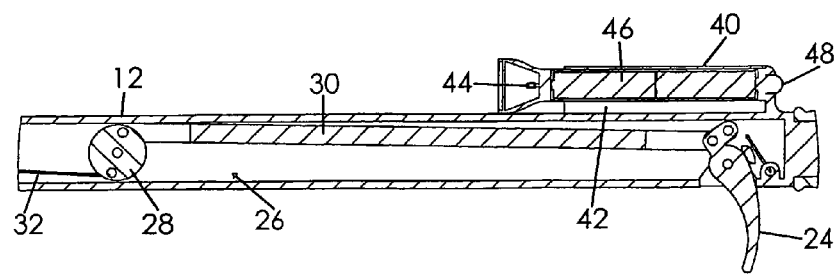

WASTE COLLECTION DEVICE

CROSS-REFERENCE TO RELATED APPLICATIONS

This application is a continuation-in-part that claims the priority of non-provisional application Ser. No. 11/240,300 filed Sep. 28, 2005 now abandoned which claims priority of provisional application 60/705,148 filed Aug. 4, 2005.

BACKGROUND OF THE INVENTION

This invention relates generally to pet care and grooming products and, more particularly, to a device for collecting dog waste before it touches the ground and without a person having to touch it.

Many pet owners or those who walk dogs occupationally seek to collect dog waste after a dog has defecated so as not to leave the waste in the grass, on a sidewalk, or the like. It is considered discourteous to allow one's dog to leave waste in a neighbors yard, for example. However, collecting a dog's waste typically involves the owner having to bend over and scoop the waste into a bag and sometimes even results in the dog owner or dog walker getting some of the waste on his hands.

Various devices have been proposed in the art for catching dog waste in a bag without having to bend over or risk touching it. Although assumably effective to meet their intended purposes, the existing devices either fail to be user friendly or are difficult to operate effectively when walking a dog at night.

Therefore, it would be desirable to have a device for catching and collecting dog waste as the dog is having a bowel movement such that the waste never touches the ground and a user does not need to bend or touch it in order to collect it. Further, it would be desirable to have a device for catching and collecting dog waste that provides illumination for the person who is walking the dog and collecting the waste.

SUMMARY OF THE INVENTION

Accordingly, a waste collecting device according to the present invention includes an elongate housing having first and second ends. An ergonomic handle may be positioned adjacent the housing first end. A clamp assembly is coupled to the housing second end that includes a pair of hook members pivotally movable between open and closed configurations. A disposable bag may be positioned on the hook members into which a dog's waste may be collected and disposed. A manually operated trigger may be attached to the housing adjacent the handle that is operatively connected to the clamp assembly for moving the hook members between the open and closed configurations. More particularly, a linkage is situated in the housing that connects the trigger with the hook members, the linkage including a pulley, push rod, and pull string. The waste collecting device includes a light source mounted to the housing for selectively illuminating the clamp assembly and bag.

Therefore, a general object of this invention is to provide a waste collecting device that enables a person to collect and dispose of dog waste without having to see it, smell it, or touch it.

Another object of this invention is to provide the waste collecting device, as aforesaid, that enables a dog walker to prevent his dog from leaving waste on some else's property or lawn.

Still another object of this invention is to provide a waste collecting device that enables a person to collect a dog's waste into a disposable bag immediately as the dog is having the bowel movement.

Yet another object of this invention is to provide a dog waste collecting device, as aforesaid, having a light to enable a user to properly position the device to collect waste.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1a is a perspective view of a waste collection device according to a preferred embodiment of the present invention;

FIG. 1b is an isolated view on an enlarged scale of a portion of the device as in FIG. 1a;

FIG. 4a is a top view of the device as in FIG. 1a;

FIG. 4b is a sectional view taken along line 4b-4b of FIG. 4a;

FIG. 4c is an isolated view on an enlarged scale of a portion of the device as in FIG. 4b;

FIG. 4d is an isolated view on an enlarged scale taken from a portion of the device of FIG. 4d;

FIG. 5a is a perspective view of the device as in FIG. 2 with the hook members in a closed configuration;

FIG. 5b is an isolated view on an enlarged scale taken from a portion of the device of FIG. 5a;

FIG. 5c is a top view of the device as in FIG. 5a;

FIG. 5d is a sectional view taken along line 5d-5d of FIG. 5c; and

FIG. 5e is an isolated view on an enlarged scale of a portion of the device as in FIG. 5d.

DESCRIPTION OF THE PREFERRED EMBODIMENT

Figure 1:
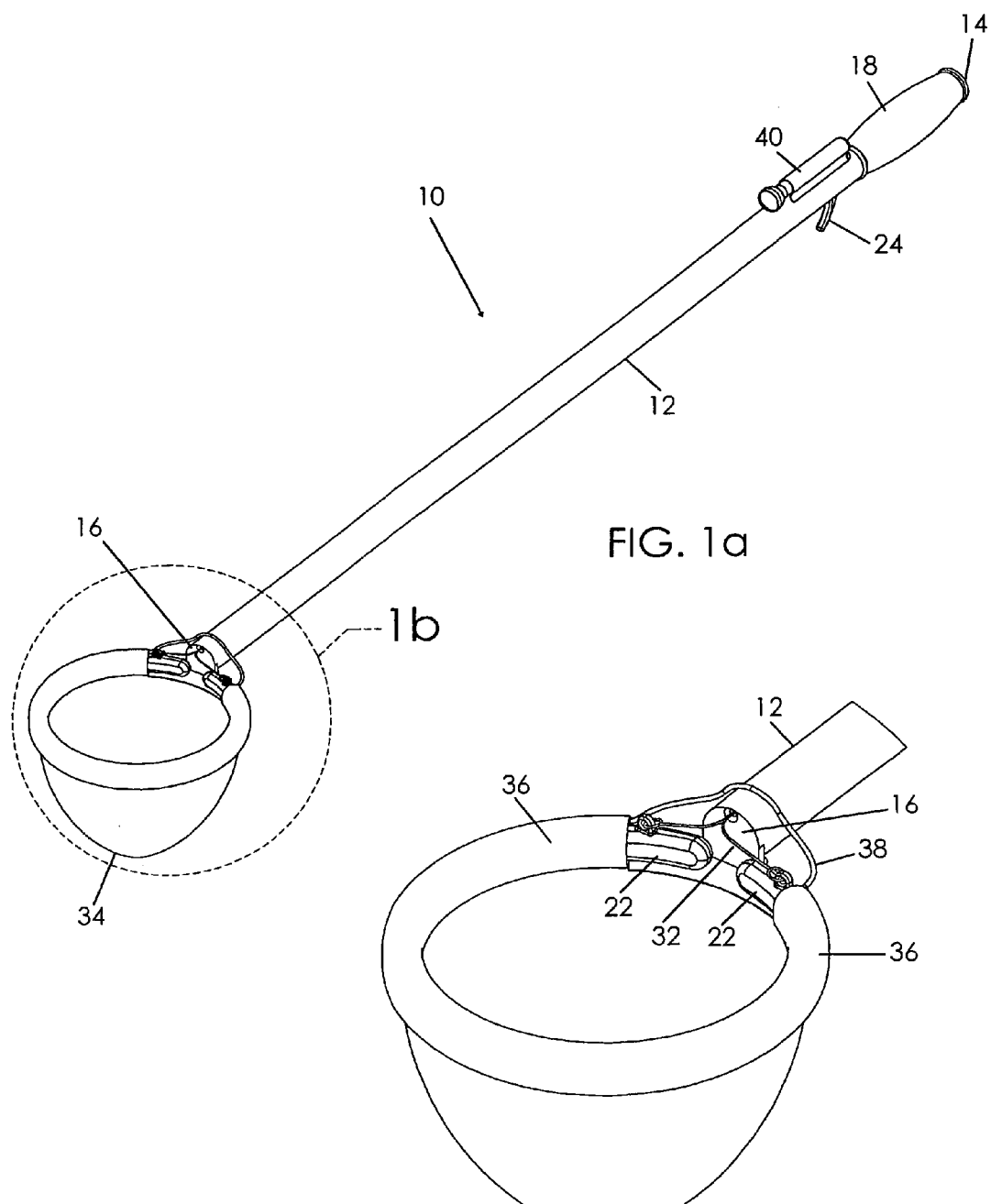

A dog waste collecting device according to a preferred embodiment of the present invention will now be described in detail with reference to FIGS. 1 to 5e of the accompanying drawings. The waste collecting device 10 includes an elongate housing 12 having a generally tubular configuration (FIG. 1a). The housing 12 also includes opposed first 14 and second 16 ends. A handle 18 having an ergonomic configuration is positioned adjacent the first end 14 of the housing 12.

Figure 2:
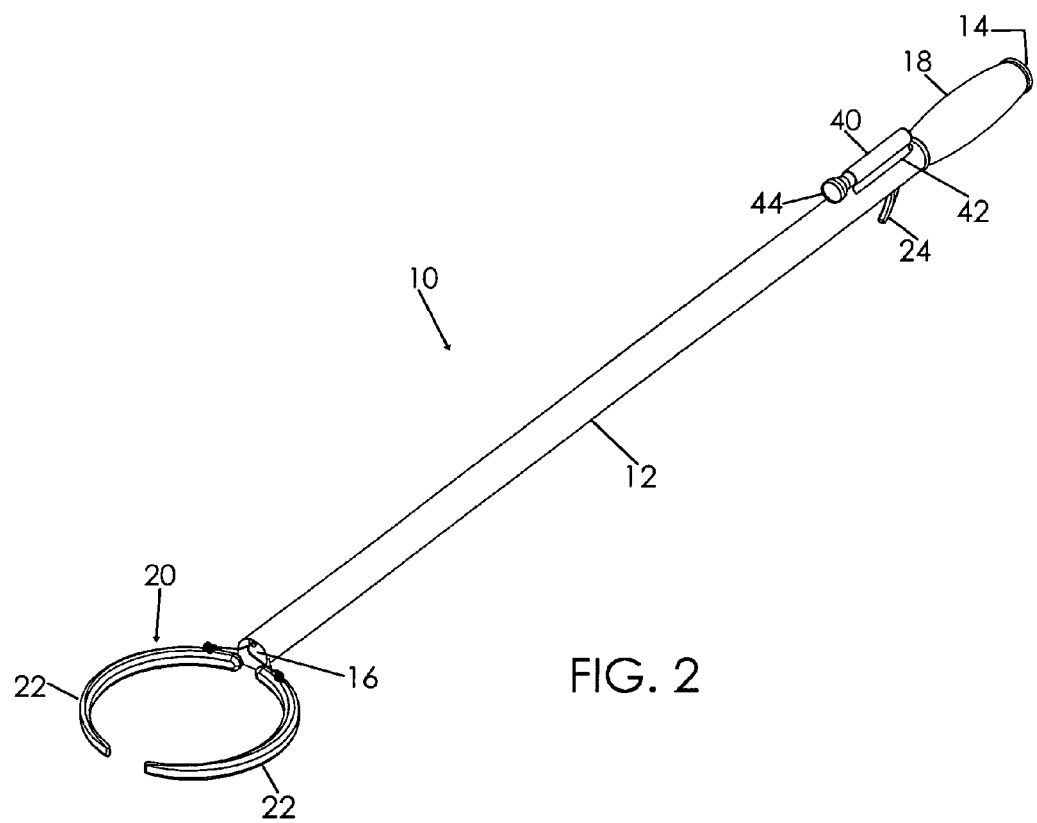
FIG. 2 is a perspective view of the device as in FIG. 1a with the disposable bag removed.

The waste collecting device 10 further includes a clamp assembly 20 coupled to the second end 16 of the housing 12 (FIGS. 1b and 2). The clamp assembly 20 includes a pair of hook members 22 pivotally coupled to the housing second end 16, the hook members 22 each having a generally arcuate configuration and being movable between open (FIG. 2) and closed configurations (FIG. 5a) as will be described in detail below.

Further, a manually operated trigger 24 is attached to the housing 12 adjacent the handle 18 and first end 14 (FIGS. 1a and 5b). The trigger 24 is operatively connected to the clamp assembly 20 for moving the hook members 22 between the open and closed configurations. More particularly, a linkage 26 is situated in the housing 12 for operatively connecting the trigger 24 with the clamp assembly 20. As best shown in FIGS. 4a to 5e, the linkage 26 includes a pulley 28 mounted in the housing 12 between the first 14 and second 16 ends, the pulley being movable about an imaginary central axis in clockwise and counterclockwise directions. The linkage 26 further includes a pushrod 30 fixedly attached at one end to the pulley 28 and at another end to the trigger 24 such that actuation of the trigger 24 causes the pushrod 30 to urge the pulley 28 in the clockwise direction. Still further, the linkage 26 includes a pull string 32 fixedly attached at one end to the pulley 28 and at an opposed end to the clamp assembly 20 such that a movement of the pulley 28 in the clockwise direction causes the hook members 22 to move from the open configuration to the closed configuration. The pull string 32 includes first and second portions (FIG. 1b) connected to respective hook members 22 such that a clockwise movement of the pulley 28 causes the hook members 22 to be pivotally moved upwardly toward one another (FIG. 5a).

The waste collecting device 10 further includes a plurality of disposable bags 34. Each bag 34 includes a pair of opposed sleeves 36, each sleeve having an opening facing the other (FIG. 1b). The sleeves 36 are configured for reception upon respective hook members 22 of the clamp assembly 20. More particularly, it should be understood that a partial actuation of the trigger 24 operates the linkage 26 to move the hook members 22 to an intermediate "mount" position between the open and closed configurations described above. In this position, the sleeves 36 may be easily slipped over the hook members 22. As seen in FIG. 1b, each bag 34 presents an open end having a diametrical perimeter edge defining corresponding hemispherical edge portions, the corresponding hemispherical edge portions being coplanar when the hook members 22 are in the open configuration (FIG. 1b) and being in contact (or in closely proximate relationship) with one another when the hook members are in the closed configuration (FIG. 5a). Each bag 34 further includes a drawstring 38 threaded about the peripheral edge adjacent the open end which may be pulled to tightly close that end in a traditional manner.

Figure 3:
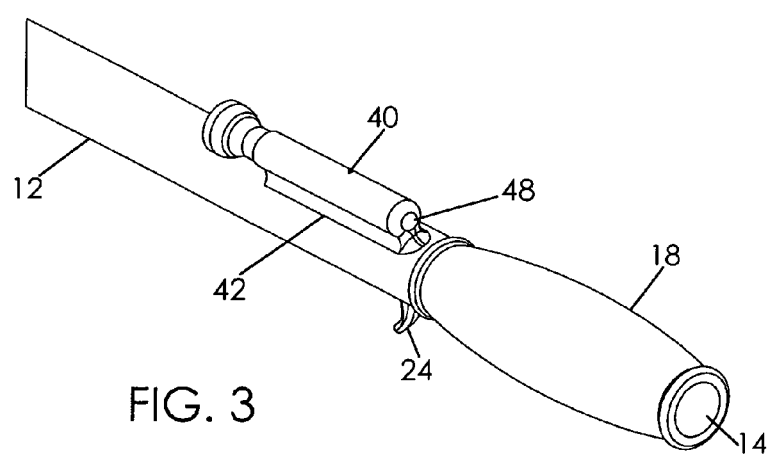
FIG. 3 is a fragmentary view of the device as in FIG. 2 from another angle.

The waste collection device 10 includes a light member 40 that is mounted to the housing 12 proximate the handle 18 (FIG. 3). Preferably, a mounting member 42 is fixedly attached to the housing 12 such the light member 40 itself may be releasably coupled to the mounting member 42. The light member 40 may be a flashlight that includes a light source 44 electrically connected to a battery 46 situated within a light member housing. The light member 40 includes a switch 48 for selectively connecting the battery 46 and the light source 44, whereby to energize the light source 44. The switch 48 is positioned such that a user may activate the switch 48 while simultaneously holding the handle 18 with the same hand. The light member 40 and light source 44 are positioned parallel to an imaginary longitudinal axis defined by the housing 12 for illuminating the clamp assembly 20 when the light source 44 is energized.

In use, a user who is walking a dog and desires to catch and collect the dog's waste may initially mount a bag 34 onto the clamp assembly 20 by partially actuating the trigger 24 and sliding the sleeves 36 of the bag 34 onto respective hook members 22. Then, when the dog crouches to pass its waste, the user, holding the housing 12 by its handle 18, may position the clamp assembly 20 and bag 34 under the dog, whereby to catch the waste through the open end of the bag 34. Thus, the waste has been collected without having to touch it. The light source 44 may be switched on so as to illuminate the clamp assembly 20 and bag 34 if it is dark outside so as to enhance the user's ability to properly position the bag beneath the dog. Next, the trigger 24 may be actuated, causing the linkage to move the hook members 22 to the closed configuration (FIG. 5a). With this maneuver, the open end of the bag 34 may be substantially closed. Finally, the user may pull the drawstring 38 to completely seal the bag 34 to eliminate all sight and smell of the waste. The bag 34 may then be slidably removed from the hook members 22 and disposed of.

It is understood that while certain forms of this invention have been illustrated and described, it is not limited thereto except insofar as such limitations are included in the following claims and allowable functional equivalents thereof.

I claim:

1. A waste collecting device, comprising:
    an elongate tubular housing having first and second ends;
    a handle positioned adjacent said housing first end;
    a clamp assembly coupled to said housing second end, said clamp assembly having a pair of hook members pivotally movable between open and closed configurations;
    a manually operated trigger attached to said housing adjacent to said handle, said trigger being operatively connected to said clamp assembly for moving said hook members between said open and closed configurations;
    a light member attached to said housing proximate said handle, said light member having a light source and being positioned to illuminate said clamp assembly when said light source is energized;
    a linkage situated in said housing for operatively connecting said trigger with said clamp assembly, said linkage including:
        a pulley mounted in said housing between said first and second ends for relative movement about an imaginary central axis in clockwise and counterclockwise directions;
        a pushrod fixedly attached to said pulley and said trigger and extending therebetween, actuation of said trigger causing said pushrod to pull said pulley in said clockwise direction; and
        a pull string fixedly attached to said pulley and said clamp assembly such that a movement of said pulley in said clockwise direction causes said hook members to move from said open configuration to said closed configuration.

2. The dog waste collecting device as in claim 1 further comprising a plurality of disposable bags, each bag having opposed sleeves for slidable reception upon said hook members and having a drawstring for generally sealing said bag when pulled.

3. The dog waste collecting device as in claim 2 wherein each bag includes an open end having a diametrical perimeter edge defining corresponding hemispherical edge portions, said corresponding hemispherical edge portions being coplanar when the hook members are in said open configuration and being in contact with one another when said hook members are in said closed configuration.

4. The waste collecting device as in claim 2, wherein said drawstring extends between said open sleeves.

5. The waste collecting device as in claim 1 wherein said light member includes:
    a battery electrically connected to said light source; and
    a switch for selectively connecting said battery and said light source, whereby to energize said light source.

6. The waste collecting device as in claim 3 wherein said switch is positioned such that a user may activate said switch while simultaneously holding said handle with the same hand.

7. The waste collecting device as in claim 1 wherein each hook member includes a generally arcuate configuration.

8. The waste collecting device as in claim 1 wherein said pull string includes first and second portions connected to respective hook members such that a clockwise movement of said pulley causes said hook members to be pivotally moved upwardly toward one another.

9. A waste collecting device, comprising:
an elongate tubular housing having first and second ends;
a clamp assembly coupled to said housing second end, said clamp assembly having a pair of hook members pivotally movable between open and closed configurations;
a manually operated trigger attached to said housing adjacent to said housing first end, said trigger being operatively connected to said hook members for selectively moving said hook members between said open and closed configurations; and
a light source attached to said housing and electrically coupled to a battery, said light source being positioned to illuminate said clamp assembly when energized by said battery;
a linkage situated in said housing for operatively connecting said trigger with said clamp assembly, said linkage including:
a pulley mounted in said housing between said first and second ends for relative movement about an imaginary central axis in clockwise and counterclockwise directions;
a pushrod fixedly attached to said pulley and said trigger and extending therebetween, actuation of said trigger causing said pushrod to pull said pulley in said clockwise direction; and
a pull string fixedly attached to said clamp assembly such that a movement of said pulley in said clockwise direction causes said hook members to move from said open configuration to said closed configuration.

10. The waste collecting device as in claim 9, further comprising a handle positioned adjacent said housing first end, said handle having an ergonomic configuration.

11. The waste collecting device as in claim 9, further comprising a plurality of disposable bags, each bag having opposed sleeves for slidable reception upon said hook members and having a drawstring for generally sealing said bag when pulled.

12. The waste collecting device as in claim 11 wherein each bag includes an open end having a diametrical perimeter edge defining corresponding hemispherical edge portions, said corresponding hemispherical edge portions being coplanar when the hook members are in said open configuration and being in contact with one another when said hook members are said closed configuration.

13. The waste collecting device as in claim 11 wherein said drawstring extends between said open sleeves.

14. The waste collecting device as in claim 9 further comprising:
a handle positioned adjacent said housing first end;
a switch electrically coupled to said light source and to said battery for selectively enabling said battery to energize said light source, said switch being positioned such that a user may simultaneously hold said handle and activate said switch with a single hand.

15. The waste collecting device as in claim 9 wherein each hook member includes a generally arcuate configuration.

16. The waste collecting device as in claim 9 wherein said pull string includes first and second portions connected to respective hook members such that a clockwise movement of said pulley causes said hook members to be pivotally moved upwardly toward one another.

17. The waste collecting device as in claim 9 further comprising a mounting member, said light source being selectively removable from said mounting member.

18. A waste collecting device, comprising:
an elongate tubular housing having first and second ends;
a handle positioned adjacent said housing first end;
a clamp assembly coupled to said housing second end, said clamp assembly having a pair of hook members pivotally movable between open and closed configurations;
a manually operated trigger attached to said housing adjacent to said handle;
a linkage situated in said housing for operatively connecting said trigger with said clamp assembly, said linkage including:
a pulley mounted in said housing between said first and second ends for relative movement about an imaginary central axis in clockwise and counterclockwise directions;
a pushrod fixedly attached to said pulley and said trigger and extending therebetween, actuation of said trigger causing said pushrod to pull said pulley in said clockwise direction;
a pull string fixedly attached to said pulley and said clamp assembly such that a movement of said pulley in said clockwise direction causes said hook members to move from said open configuration to said closed configuration;
a light member mounting member attached to said housing proximate said handle; and
a light member releasably coupled to said light member mounting member, said light member having a light source and being positioned to illuminate said clamp assembly when said light source is energized.

* * * * *